(12) United States Patent
Gao et al.

(10) Patent No.: US 12,500,724 B2
(45) Date of Patent: *Dec. 16, 2025

(54) METHODS AND APPARATUSES FOR TRANSMITTING CONTROL INFORMATION

(71) Applicant: NEC CORPORATION, Tokyo (JP)

(72) Inventors: Yukai Gao, Beijing (CN); Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 120 days.

This patent is subject to a terminal disclaimer.

(21) Appl. No.: 18/087,102

(22) Filed: Dec. 22, 2022

(65) Prior Publication Data

US 2023/0137428 A1    May 4, 2023

Related U.S. Application Data

(63) Continuation of application No. 16/648,543, filed as application No. PCT/CN2017/102223 on Sep. 19, 2017, now Pat. No. 11,595,175.

(51) Int. Cl.
*H04W 4/00* (2018.01)
*H04L 5/00* (2006.01)

(52) U.S. Cl.
CPC .......... *H04L 5/0053* (2013.01); *H04L 5/001* (2013.01); *H04L 5/0094* (2013.01)

(58) Field of Classification Search
CPC ..... H04L 5/0053; H04L 5/001; H04L 5/0094; Y02D 30/70
See application file for complete search history.

(56) References Cited

U.S. PATENT DOCUMENTS 11,190,298 B2 * 11/2021 Zhu ............... H04L 1/0038
11,595,175 B2 * 2/2023 Gao ............... H04L 5/0053
(Continued)

FOREIGN PATENT DOCUMENTS

CN   110062468 A  *  7/2019  .......... H04L 1/1614
EP     3941132 A1  *  1/2022  .......... H04L 1/0038
(Continued)

OTHER PUBLICATIONS

"NR PDCCH: Search Spaces and monitoring behavior", Intel Corporation, 3GPP TSG RAN WG1 NR Adhoc #2, R1-1710544, Jun. 20-23, 2017 (11 pages).
(Continued)

*Primary Examiner* — Thai Dinh Hoang
(74) *Attorney, Agent, or Firm* — Sughrue Mion, PLLC

(57) ABSTRACT

Embodiments of the present disclosure relate to methods and apparatuses for transmitting control information. In example embodiments, a method implemented in a network device is provided. According to the method, a configuration for PDCCH transmission is determined at least based on a periodicity of a plurality of symbol-based control resource sets (CORESETs) within one slot. The configuration indicates an allocation of a first number of PDCCH candidates to the plurality of symbol-based CORESETs. The first number of PDCCH candidates is less than a second number of PDCCH candidates preconfigured for a slot-based CORESET. The configuration is transmitted to a terminal device served by the network device. Downlink control information (DCI) is transmitted based on the configuration to the terminal device in the plurality of symbol-based CORESETs.

17 Claims, 10 Drawing Sheets

(56) References Cited

U.S. PATENT DOCUMENTS

| | | | | |
|---|---|---|---|---|
| 2011/0110316 | A1* | 5/2011 | Chen | H04L 5/0053 370/329 |
| 2011/0228724 | A1* | 9/2011 | Gaal | H04L 5/0042 370/328 |
| 2017/0257860 | A1 | 9/2017 | Nam et al. | |
| 2018/0227156 | A1* | 8/2018 | Papasakellariou | H04W 72/0453 |
| 2018/0324816 | A1* | 11/2018 | Islam | H04L 5/0053 |
| 2019/0124627 | A1* | 4/2019 | Park | H04L 5/0053 |
| 2019/0165895 | A1* | 5/2019 | Kim | H04W 28/18 |
| 2020/0021474 | A1* | 1/2020 | Papasakellariou | H04W 72/0453 |
| 2020/0154413 | A1* | 5/2020 | Hosseini | H04W 72/0446 |
| 2020/0351838 | A1* | 11/2020 | Kim | H04L 5/0055 |
| 2020/0374960 | A1* | 11/2020 | Deenoo | H04B 7/0695 |
| 2020/0389847 | A1* | 12/2020 | Deng | H04W 52/0219 |
| 2021/0091988 | A1* | 3/2021 | Papasakellariou | H04W 72/23 |
| 2021/0227512 | A1* | 7/2021 | Solano Arenas | H04L 5/0082 |

FOREIGN PATENT DOCUMENTS

| | | | | |
|---|---|---|---|---|
| EP | 3952158 A1 * | 2/2022 | | H04L 1/0023 |
| WO | 2013168901 A1 | 11/2013 | | |
| WO | 2015/046165 A1 | 4/2015 | | |
| WO | 2015057367 A1 | 4/2015 | | |
| WO | WO-2018031623 A1 * | 2/2018 | | |
| WO | WO-2019098761 A1 * | 5/2019 | | H04L 1/0038 |
| WO | WO-2020036334 A1 * | 2/2020 | | H04B 7/0617 |

OTHER PUBLICATIONS

"PDCCH search space design", Catt, 3GPP TSG RAN WG1 Meeting AH_#NR3, R1-1715813, Sep. 18-21, 2017 (10 pages).

Office Action dated Dec. 26, 2022 in Chinese Application No. 201780095010.X.

International Search Report dated May 16, 2018 issued by the Int. Searching Authority in Application No. PCT/CN2017/102223 (PCT/ISA/210).

Written Opinion dated May 16, 2018 issued by the Int. Searching Authority in Application No. PCT/CN2017/102223 (PCT/ISA/237).

Intel Corporation, "On CORESETs and search spaces", 3GPP TSG RAN WG1 NR Adhoc#3, R1-1716306, Nagoya, Japan, Sep. 18-21, 2017 (14 pages total).

MediaTek Inc., "Discussions on search space and CORESET designs", 3GPP TSG RAN WG1 Meeting AH_NR#3, R1-1716198, Nagoya, Japan, Sep. 18-21, 2017 (12 pages total).

"NR-PDCCH Design for URLLC", Samsung, 3GPP TSG RAN WG1 Meeting #88bis, R1-1705383, Spokane, USA, Apr. 3-7, 2017, pp. 2-8 (7 pages total).

"Remaining Issues on search space design", vivo, 3GPP TSG RAN WG1 NR Ad Hoc #3, R1-1715629, Nagoya, Japan, Sep. 18-21, 2017, pp. 2-10 (9 pages total).

"On the CORESET configuration and search space design", Nokia, 3GPP TSG RAN WG1 Meeting NR#3, R1-1715749, Nagoya, Japan, Sep. 18-21, 2017, (5 pages total).

Office Action issued Sep. 7, 2021 in Japanese Application No. 2020-516464.

Office Action issued Jun. 7, 2022 in Japanese Application No. 2020-516464.

JP Office Action for JP Application No. 2023-018439, mailed on Apr. 16, 2024 with English Translation.

NTT Docomo, Inc., "Search space design for NR-PDCCH", 3GPP TSG RAN WG1 Meeting NR#3 R1-1716094, Sep. 12, 2017, pp. 1-pp. 11.

ZTE, "NR-PDCCH for supporting URLLC", 3GPP TSG RAN WG1 Meeting #90 R1-1712447, Aug. 12, 2017, pp. 1-pp. 7.

* cited by examiner

METHODS AND APPARATUSES FOR TRANSMITTING CONTROL INFORMATION

CROSS REFERENCE TO RELATED APPLICATIONS

This application is a Continuation of U.S. application Ser. No. 16/648,543 filed Mar. 18, 2020, which is a National Stage of International Application No. PCT/CN2017/102223 filed Sep. 19, 2017, the content of the above are incorporated herein by reference in their entirety.

TECHNICAL FIELD

Embodiments of the present disclosure generally relate to the field of telecommunication, and in particular, to methods and apparatuses for transmitting control information.

BACKGROUND

With the development of communication technologies, multiple types of services or traffic have been proposed, for example, enhanced mobile broadband (eMBB) generally requiring high data rate, massive machine type communication (mMTC) typically requiring long battery lifetime, and ultra-reliable and low latency communication (URLLC). Meanwhile, multi-antenna schemes, such as multi-Transmission and Reception Point (multi-TRP) transmission and/or multi-panel transmission, are studied for new radio access.

Conventionally, a network device (for example, an eNB, a gNB or a TRP) may transmit Downlink Control Information (DCI) via a Physical Downlink Control Channel (PDCCH) to a terminal device (for example, a user equipment (UE)) in the system. A PDCCH may be transmitted on one or more consecutive control channel elements (CCEs). The DCI may indicate resource allocation for uplink and/or downlink data transmission for example. Since the terminal device has no knowledge of its aggregation level (AL), DCI format, and resources allocated in PDCCH, blind decoding for the DCI may be necessary for the terminal device. The terminal device may attempt to blindly decode the DCI in a set of resources (also referred to as a "search space"). In response to decoding the DCI successfully, the terminal device may perform the uplink and/or downlink data transmission accordingly.

In new radio access, the search space for blind decoding the DCI may be referred to as a "CORESET", which may be mapped to a group of consecutive CCEs logically. Moreover, slot-based scheduling and non-slot-based scheduling have been designed and agreed in 3GPP specification works. In case that a CORESET for slot-based scheduling (also referred to as a slot-based CORESET) is configured for the terminal device, the terminal device may monitor the CORESET during one slot and attempt to blindly decode the DCI in the CORESET. However, in non-slot-based scheduling, a plurality of CORESETs with a periodicity within one slot (also referred to as symbol-based CORESETs) may be configured for the terminal device. That is, the terminal device may need to monitor different CORESETs within one slot. The number of CORESET monitoring occasions, determined by the periodicity, may be significantly increased as compared with slot-based scheduling. This may result in high complexity, high latency and/or high power consumption for the terminal device to blindly decode the DCI.

SUMMARY

In general, example embodiments of the present disclosure provide methods and apparatuses for transmitting control information.

In a first aspect, there is provided a method implemented in a network device. According to the method, a configuration for PDCCH transmission is determined at least based on a periodicity of a plurality of symbol-based control resource sets (CORESETs) within one slot. The configuration indicates an allocation of a first number of PDCCH candidates to the plurality of symbol-based CORESETs. The first number of PDCCH candidates is less than a second number of PDCCH candidates preconfigured for a slot-based CORESET. The configuration is transmitted to a terminal device served by the network device. Downlink control information (DCI) is transmitted based on the configuration to the terminal device in the plurality of symbol-based CORESETs.

In a second aspect, there is provided a method implemented in a terminal device. According to the method, a configuration for PDCCH transmission is received from a network device serving the terminal device. The configuration indicates an allocation of a first number of PDCCH candidates to the plurality of symbol-based CORESETs. The first number of PDCCH candidates is less than a second number of PDCCH candidates preconfigured for a slot-based CORESET. Respective blind detections for downlink control information (DCI) is performed based on the configuration in the plurality of symbol-based CORESETs.

In a third aspect, there is provided a network device. The network device comprises a processor and a memory coupled to the processor. The memory stores instructions that when executed by the processor, cause the network device to perform actions. The actions comprise: determining, at least based on a periodicity of a plurality of symbol-based control resource sets (CORESETs) within one slot, a configuration for PDCCH transmission, the configuration indicating an allocation of a first number of PDCCH candidates to the plurality of symbol-based CORESETs and the first number of PDCCH candidates being less than a second number of PDCCH candidates preconfigured for a slot-based CORESET; transmitting the configuration to a terminal device served by the network device; and transmitting, based on the configuration, downlink control information (DCI) to the terminal device in the plurality of symbol-based CORESETs.

In a fourth aspect, there is provided a terminal device. The terminal device comprises a processor and a memory coupled to the processor. The memory stores instructions that when executed by the processor, cause the terminal device to perform actions. The actions comprise: receiving, from a network device serving the terminal device, a configuration for PDCCH transmission, the configuration indicating an allocation of a first number of PDCCH candidates to a plurality of symbol-based control resource sets (CORESETs) within one slot, and the first number of PDCCH candidates being less than a second number of PDCCH candidates preconfigured for a slot-based CORESET; and performing, based on the configuration, respective blind detections for downlink control information (DCI) in the plurality of symbol-based CORESETs.

In a sixth aspect, there is provided a computer readable medium having instructions stored thereon. The instructions, when executed on at least one processor, cause the at least one processor to carry out the method according to the second aspect.

In a seventh aspect, there is provided a computer program product that is tangibly stored on a computer readable storage medium. The computer program product includes instructions which, when executed on at least one processor, cause the at least one processor to carry out the method according to the first aspect or the second aspect.

Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Figure 1:
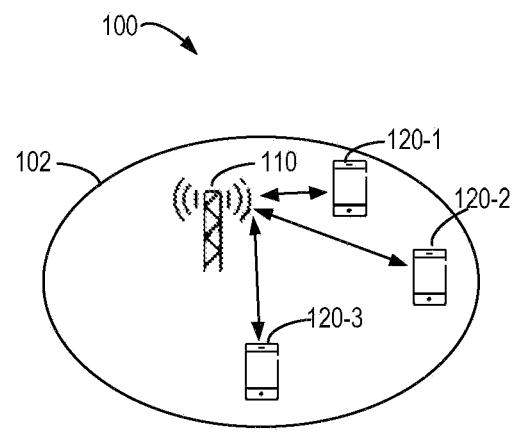
FIG. 1 is a block diagram of a communication environment in which embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "network device" or "base station" (BS) refers to a device which is capable of providing or hosting a cell or coverage where terminal devices can communicate. Examples of a network device include, but not limited to, a Node B (NodeB or NB), an Evolved NodeB (eNodeB or eNB), a next generation NodeB (gNB) a Remote Radio Unit (RRU), a radio head (RH), a remote radio head (RRH), a low power node such as a femto node, a pico node, a TRP, and the like. For the purpose of discussion, in the following, some embodiments will be described with reference to TRP as examples of the network device.

As used herein, the term "terminal device" refers to any device having wireless or wired communication capabilities. Examples of the terminal device include, but not limited to, user equipment (UE), personal computers, desktops, mobile phones, cellular phones, smart phones, personal digital assistants (PDAs), portable computers, image capture devices such as digital cameras, gaming devices, music storage and playback appliances, or Internet appliances enabling wireless or wired Internet access and browsing and the like. For the purpose of discussion, in the following, some embodiments will be described with reference to UE as examples of the terminal device.

As used herein, the singular forms "a", "an" and "the" are intended to include the plural forms as well, unless the context clearly indicates otherwise. The term "includes" and its variants are to be read as open terms that mean "includes, but is not limited to." The term "based on" is to be read as "at least in part based on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be included below.

In some examples, values, procedures, or apparatus are referred to as "best," "lowest," "highest," "minimum," "maximum," or the like. It will be appreciated that such descriptions are intended to indicate that a selection among many used functional alternatives can be made, and such selections need not be better, smaller, higher, or otherwise preferable to other selections.

Communication discussed in the present disclosure may conform to any suitable standards including, but not limited to, New Radio Access (NR), Long Term Evolution (LTE), LTE-Evolution, LTE-Advanced (LTE-A), Wideband Code Division Multiple Access (WCDMA), Code Division Multiple Access (CDMA) and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

FIG. 1 shows an example communication network 100 in which embodiments of the present disclosure can be implemented. The network 100 includes a network device 110 and three terminal devices 120-1 and 120-3 (collectively referred to as terminal devices 120 or individually referred to as terminal device 120) served by the network device 110. The coverage of the network device 110 is also called as a cell 102. It is to be understood that the number of base stations and terminal devices is only for the purpose of illustration without suggesting any limitations. The network 100 may include any suitable number of base stations and the terminal devices adapted for implementing embodiments of the present disclosure. Although not shown, it would be appreciated that there may be one or more neighboring cells adjacent to the cell 102 where one or more corresponding network devices provides service for a number of terminal device located therein.

The network devices 110 may communicate with the terminal device 120. The communications in the network 100 may conform to any suitable standards including, but not limited to, Long Term Evolution (LTE), LTE-Evolution, LTE-Advanced (LTE-A), Wideband Code Division Multiple Access (WCDMA), Code Division Multiple Access (CDMA) and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

In addition to normal data communications, the network device 110 may transmit control information to the terminal device 120 in a downlink. As used herein, a "downlink (DL)" refers to a link from a network device to a terminal device, while an "uplink (UL)" refers to a link from the terminal device to the network device. For example, the network device 110 may transmit DCI via a PDCCH to the terminal device 120. The DCI may indicate resource allocation for data transmission in a downlink or uplink. A PDCCH may be transmitted on one CCE or an aggregation of several consecutive CCEs, where a CCE may correspond to several resource element groups (REGs). The number of consecutive CCEs occupied by a PDCCH may be referred to as an "aggregation level (AL)".

As the terminal device 120 is not explicitly informed of the detailed control channel structure, it has to blindly attempt to decode the DCI. In response to decoding the DCI successfully, the terminal device 120 may perform the uplink and/or downlink data transmission (for example, data transmission via PDSCH and/or Physical Uplink Shared Channel (PUSCH)) with the network device 110 accordingly. Since multiple PDCCHs can be transmitted in a subframe, the terminal device 120 has to monitor all PDCCHs in a given subframe control region. To simplify the decoding task at the terminal device 120, the whole control region can be sub-divided into common and UE-specific search spaces that the UE should monitor (so as to attempt to decode each of the PDCCHs). Each search space may comprise several PDCCH candidates whose data length depends on the PDCCH format. The PDCCH candidates may consist of consecutive CCEs. Therefore, the size of a search space may be determined by the number of PDCCH candidates therein and the AL. For example, Table 1 shows the number of PDCCH candidates associated with each aggregation level in a LTE system.

TABLE 1

| Type | Search space Aggregation Level L | Size [in CCEs] | Number of PDCCH candidates $M^{(L)}$ |
|---|---|---|---|
| UE-specific | 1 | 6 | 6 |
|  | 2 | 12 | 6 |
|  | 4 | 8 | 2 |
|  | 8 | 16 | 2 |

TABLE 1-continued

| Type | Search space Aggregation Level L | Size [in CCEs] | Number of PDCCH candidates $M^{(L)}$ |
|---|---|---|---|
| Common | 4 | 16 | 4 |
|  | 8 | 16 | 2 |

As described above, in new radio access, a search space for blind decoding the DCI (also called as "blind detection") may be referred to as a "CORESET", which can be mapped to a group of consecutive CCEs logically. Moreover, slot-based scheduling and non-slot-based scheduling have been enabled.

Figure 2:
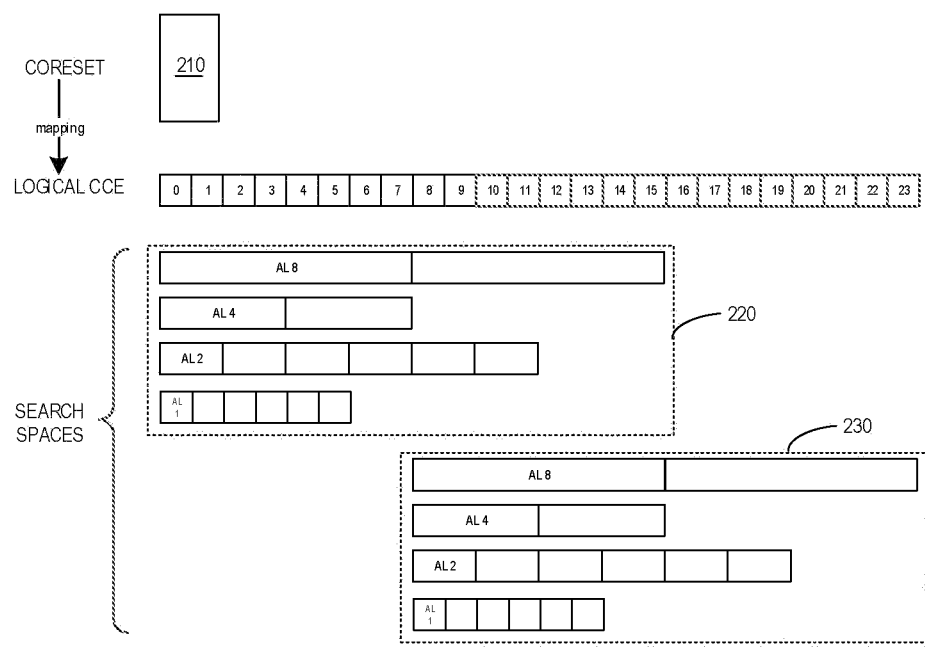
FIG. 2 shows nested search spaces in slot-based scheduling.

In slot-based scheduling, a slot-based CORESET may be configured for the terminal device 120. The terminal device 120 may monitor the slot-based CORESET during one slot. In this case, nested search spaces can be supported. For example, FIG. 2 shows nested search spaces in slot-based scheduling. As shown in FIG. 2, a slot-based CORESET 210 may correspond to 24 consecutive CCEs logically. A search space 220 for the terminal device 120-1 and a search space 230 for the terminal device 120-2 are shown in FIG. 2.

Taking the search space 220 as an example, the search space 220 associated with the highest AL 8 for the terminal device 120-1 may be determined like LTE (such as Table 1). For example, the search space 220 may have a size of 16 CCEs totally. PDCCH candidates for other ALs can be allocated within the determined search space 220. The first CCE index for a PDCCH candidate can be determined as a function of a UE-ID of the terminal device 120 (represented as a parameter p1), the number of PDCCH candidates in the search space (represented as a parameter p2), the number of CCEs occupied by the PDCCH candidate (represented as a parameter p3), the number of CCEs in the slot-based CORESET (represented as a parameter p4), and a randomization factor (represented as a parameter p5). That is, the first CCE index for a PDCCH candidate can be defined as $f$ (p1, p2, p3, p4, p5). In slot-based scheduling, the maximum number of PDCCH blind detections (BDs) per slot per carrier may be limited to a constant, such as 44.

However, in non-slot-based scheduling (also called as "symbol-based scheduling"), a plurality of symbol-based CORESETs with a predefined periodicity within one slot may be configured for the terminal device 120. The terminal device 120 may need to monitor different CORESETs within one slot, and the number of CORESET monitoring occasions may be significantly increased as compared with slot-based scheduling. In this case, it may be undesirable for the terminal device 120 to perform PDCCH blind detections in the entire search space per monitoring occasion, which may result in high complexity, high latency and/or high power consumption thereof. Therefore, the maximum number of BDs per monitoring occasion needs to be reduced for non-slot-based scheduling.

In order to solve the problems above and one or more of other potential problems, a solution for transmitting control information is provided in accordance with example embodiments of the present disclosure. With the solution, a reduced number of PDCCH candidates as compared with slot-based scheduling can be allocated to the plurality of symbol-based CORESETs by the network device 110. Accordingly, the search space for blind decoding the DCI can be reduced and the number of BDs performed by the terminal device 120 can be likewise reduced.

Figure 3:
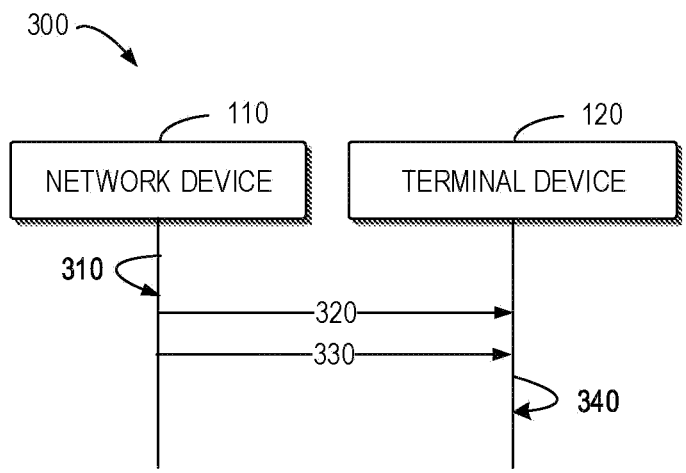
FIG. 3 shows a process for transmitting control information according to some embodiments of the present disclosure.

Principle and implementations of the present disclosure will be described in detail below with reference to the following figures, in which FIG. 3 shows a process 300 for transmitting control information according to some embodiments of the present disclosure. For the purpose of discussion, the process 300 will be described with reference to FIG. 1. The process 300 may involve the network device 110 and one or more terminal devices 120 served by the network device 110.

In some embodiments, the network device 110 may determine (310), at least based on a periodicity of a plurality of symbol-based CORESETs within one slot, a configuration for PDCCH transmission. In some embodiments, at a given numerology, for example, if one slot consists of 14 symbols, the periodicity of the symbol-based CORESETs can be X symbols, where X is an integer and $1 \leq X \leq 14$. For example, in this case, the periodicity is 2 symbols or 7 symbols. In some embodiments, the configuration may indicate an allocation of a number of PDCCH candidates (also referred to as "a first number of PDCCH candidates") to the plurality of symbol-based CORESETs. The first number of PDCCH candidates may be less than a number of PDCCH candidates (also referred to as "a second number of PDCCH candidates") preconfigured for a slot-based CORESET. In some embodiments, the network device 110 transmits (320) the configuration for PDCCH transmission to the terminal device 120. In one embodiment, the configuration for PDCCH transmission can be transmitted via higher layer signaling. In one embodiment, the network device 110 and the terminal device 120 may be preconfigured with the configuration for PDCCH transmission, and thus no signaling may be needed for transmitting the configuration. In one embodiment, the configuration for PDCCH transmission can be implicitly indicated by the CORESET periodicity. For example, in response to the CORESET periodicity being configured for the network device 110 and the terminal device 120, the configuration for PDCCH can be determined. Then, the network device (330) transmits, based on the configuration, downlink control information (DCI) to the terminal device 120 in the plurality of symbol-based CORESETs. On the other side, in response to obtaining the configuration for PDCCH transmission, the terminal device 120 performs (340), based on the configuration, respective blind detections for DCI in the plurality of symbol-based CORESETs. Examples of some embodiments will be further described in detail in the following.

In some embodiments, the maximum number of PDCCH candidates for symbol-based CORESETs may be different from the maximum number of PDCCH candidates for slot-based CORESETs. In one embodiment, the maximum number of PDCCH candidates for symbol-based CORESETs may be no more than the maximum number of PDCCH candidates for slot-based CORESETs.

In some embodiments, for at least one of the aggregation levels, the number of PDCCH candidates for symbol-based CORESETs may be different from those of the slot-based CORESETs. In one embodiment, for at least one of the aggregation levels, the number of PDCCH candidates for symbol-based CORESETs may be no more than those of the slot-based CORESETs.

In some embodiments, the maximum number of PDCCH candidates may be different for different periodicities of symbol-based CORESETs. In one embodiment, the maximum number of PDCCH candidates for symbol-based CORESETs associated with a smaller value of periodicity may be no more than the maximum number of PDCCH candidates for symbol-based CORESETs associated with a larger value of periodicity. In some embodiments, for at least one of the aggregation levels for symbol-based CORESETs, the number of PDCCH candidates may be different for different periodicities. In one embodiment, for at least one of the aggregation levels for symbol-based CORESETs, the number of PDCCH candidates for a smaller value of periodicity may be no greater than the number of PDCCH candidates for a larger value of periodicity.

In one embodiment, as described above, for one configuration, the periodicity of the symbol-based CORESETs can be $X_1$ symbols. The maximum number of PDCCH candidates may be $Y_1$. The number of PDCCH candidates for AL i may be $Z_{i\_1}$. In another embodiment, for another configuration, the periodicity of the symbol-based CORESETs can be $X_2$ symbols, and the maximum number of PDCCH candidates may be $Y_2$. The number of PDCCH candidates for AL i may be $Z_{i\_2}$. In one embodiment, if the periodicity value $X_1 < X_2$, the maximum number of PDCCH candidates $Y_1$ may be no greater than $Y_2$. In another embodiment, if the periodicity value $X_1 < X_2$, the number of PDCCH candidates for AL i, $Z_{i\_1}$ may be no greater than $Z_{i\_2}$. In one embodiment, the number of PDCCH candidates for some ALs may be 0.

In some embodiments, the maximum number of PDCCH candidates for CORESETs may be different when the CORESETs are configured with different numerologies. For example, the numerology may include at least one of cyclic prefix (CP) length and subcarrier spacing.

In one embodiment, as described above, for one configuration, the subcarrier spacing value of the CORESETs can be $S_1$ kHz. The maximum number of PDCCH candidates may be $Y_{s1}$. The number of PDCCH candidates for AL i may be $Z_{i\_s1}$. In another embodiment, for another configuration, the subcarrier spacing value of the CORESETs can be $S_2$ kHz, and the maximum number of PDCCH candidates may be $Y_{s2}$. The number of PDCCH candidates for AL i may be $Z_{i\_s2}$. In one embodiment, if the subcarrier spacing value $S_1 > S_2$, the maximum number of PDCCH candidates $Y_{s1}$ may be no greater than $Y_{s2}$. In another embodiment, if the periodicity value $S_1 > S_2$, the number of PDCCH candidates for AL i, $Z_{i\_s1}$ may be no greater than $Z_{i\_s2}$. In one embodiment, the number of PDCCH candidates for some ALs may be 0.

In some embodiments, the totally maximum number of PDCCH candidates may be fixed for one time duration. In one embodiment, the time duration may be one absolute time duration, for example, T ms. In one embodiment, the totally maximum number of PDCCH candidates within T ms may be $Y_{max}$. In one embodiment, within the T ms, the number of CORESETs for one UE may be N. In one embodiment, for each of the CORESETs, the number of CORESETs may be $Y_n$, where $1 \leq n \leq N$, and the total number of PDCCH candidates for all of the CORESETs is no greater than $Y_{max}$. That is, $\Sigma_1^N Y_n = Y_{max}$ or $\Sigma_1^N Y_n < Y_{max}$. For example, for each of the CORESETs, the number of PDCCH candidates may be evenly split into floor($Y_{max}/N$).

In one embodiment, as described above, each of the plurality of symbol-based CORESETs may have less PDCCH candidates than the slot-based CORESETs. That is, the slot-based CORESET may correspond to an unreduced search space for PDCCH, while the plurality of symbol-based CORESETs may correspond to reduced search spaces for PDCCH. In one embodiment, a respective number of PDCCH candidates for each AL can be reduced as compared with Table 1. For example, if the number of PDCCH candidates for AL i in a slot-based CORESET is represented as $M_i^{full}$ and the number of PDCCH candidates for AL i in a symbol-based CORESET is represented as $M_i$, then $M_i = M_i^{full} * \alpha_i$, where $\alpha_i$ represents a reduction factor for AL i and $0 \leq \alpha_i \leq 1$. In another embodiment, a new table other than Table 1 can be defined for a symbol-based CORESET, indicating a respective number of PDCCH candidates for each AL, and the respective number of candidates for at least one of the aggregation levels may be reduced.

Figure 4:
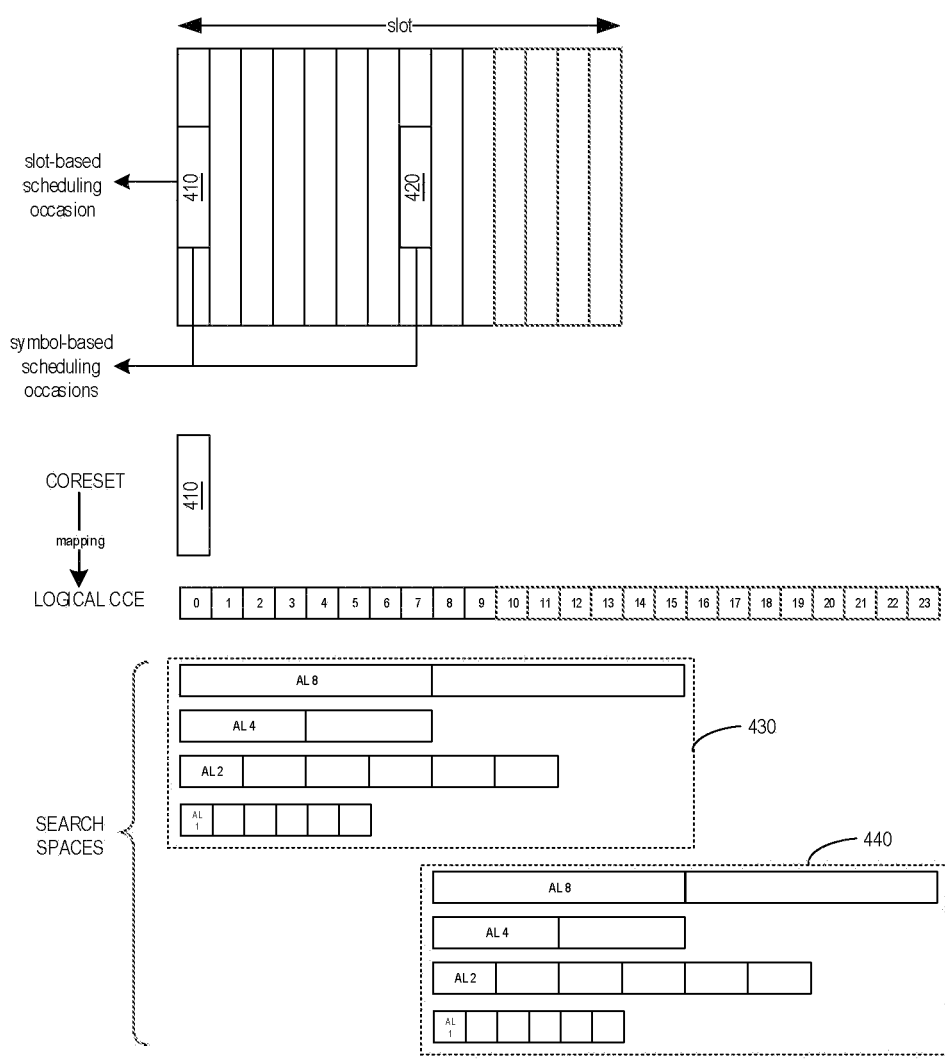
FIG. 4 shows an example of some embodiments of the present disclosure.

In some embodiments, the reduced search space for a symbol-based CORESET may occupy the same number of CCEs as the unreduced search space for a slot-based CORESET. FIG. 4 shows an example of such embodiment.

In FIG. 4, for example, each slot may include 14 symbols in total. In some embodiments, a same CORESET can be configured for both slot-based scheduling and symbol-based scheduling. For example, as shown in FIG. 4, CORESET 410 is configured for both slot-based scheduling and symbol-based scheduling. In another embodiment, different CORESETs may be configured for slot-based scheduling and symbol-based scheduling respectively. For example, in one embodiment, a new CORESET at different bandwidth part dedicated for URLLC can be used for symbol-based scheduling.

As shown in FIG. 4, CORESETs 410 and 420 with a periodicity of 7 symbols within one slot may be configured for symbol-based scheduling. Taking the CORESET 410 for symbol-based scheduling as an example, the CORESET 410 may correspond to 24 consecutive CCEs logically. A reduced search space 430 for the terminal device 120-1 and a reduced search space 440 for the terminal device 120-2 may correspond to the symbol-based CORESET 410. In one embodiment, the size of the reduced search space 430 associated with the highest AL 8 may be the same as that of the unreduced search space (for example, the search space 220 as shown in FIG. 2) for slot-based scheduling, that is 16 CCEs totally. In addition, PDCCH candidates for other ALs may be nested within the search space 430 in a same or different way as compared with slot-based scheduling. Further, the first CCE index for a PDCCH candidate may also be determined by a same function as slot-based scheduling. That is, the first CCE index for a PDCCH candidate can be defined as $f$ (p2, p3, p4, p5), where p1 is the UE_ID of the terminal device 120-1.

In some embodiments, the first CCE index for a PDCCH candidate for one UE may be defined based on the maximum AL configured for this UE. And the CCE index for a PDCCH candidate with other AL configured for this UE may have a UE-specific offset based on the first CCE index. For example, the UE-specific offset may be related to at least one of the UE_ID, RNTI.

In some embodiments, for reduced number of PDCCH candidates, the search space is still nested. For example, the number of PDCCH candidates for maximum AL configured for one UE may be reduced, for other less AL values for this UE, the CCEs for PDCCH candidates are still nested within CCEs for PDCCH candidates for the maximum AL. In one embodiment, the CCEs for PDCCH candidates for one less AL are nested within the CCEs for PDCCH candidates for a larger AL, when the number of PDCCH candidates for at least one of ALs are reduced.

In one embodiment, the reduced search space 440 for the terminal device 120-2 may share a same size with the reduced search space 430 for the terminal device 120-1, but from a different CCE index. For example, the different CCE index may be determined by applying the UE-ID of the terminal device 120-2, which is different from that of the terminal device 120-1, to the function $f$. As such, the terminal devices 120 can determine the reduced search spaces by the same function $f$ as slot-based scheduling.

Figure 5:
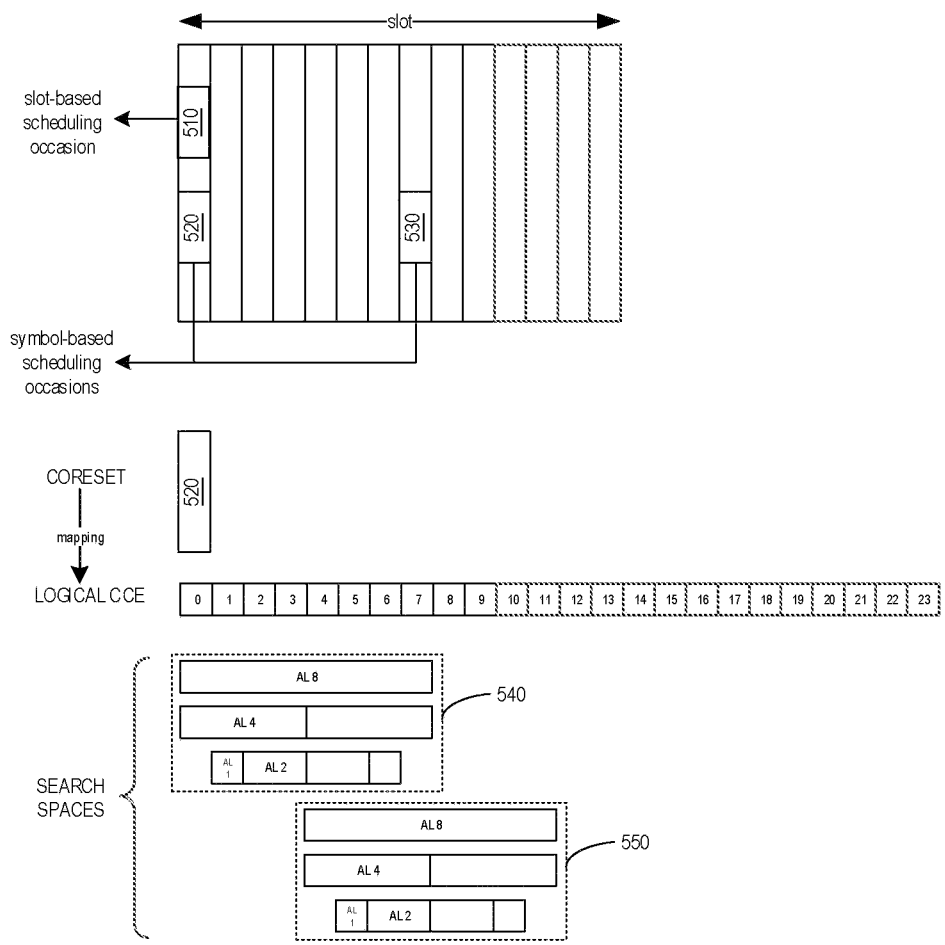
FIG. 5 shows an example of some embodiments of the present disclosure.

In one embodiment, the reduced search space for a symbol-based CORESET may occupy a reduced number of CCEs as compared with the unreduced search space for a slot-based CORESET. FIG. 5 shows an example of such embodiment.

In FIG. 5, for example, each slot may include 14 symbols in total. In some embodiments, a same CORESET can be configured for both slot-based scheduling and symbol-based scheduling. In another embodiment, different CORESETs may be configured for slot-based scheduling and symbol-based scheduling respectively. For example, in one embodiment, a new CORESET at different bandwidth part dedicated for URLLC can be used for symbol-based scheduling. As shown in FIG. 5, CORESET 510 is configured for slot-based scheduling, while CORESETs 520 and 530 with a periodicity of 7 symbols within one slot are configured for symbol-based scheduling.

Taking the CORESET 520 for symbol-based scheduling as an example, the CORESET 510 may correspond to 24 consecutive CCEs logically. A reduced search space 540 for the terminal device 120-1 and a reduced search space 550 for the terminal device 120-2 may correspond to the symbol-based CORESET 520. In one embodiment, the size of the reduced search space 540 associated with the highest AL 8 may be smaller than that of the unreduced search space (for example, the search space 220 as shown in FIG. 2) for slot-based scheduling. As shown in FIG. 5, the size of the reduced search space 540 associated with the highest AL 8 is 8 CCEs totally, which is only half of the size of the search space 220 for slot-based scheduling. PDCCH candidates for other ALs may be nested within the search space 430 in a same or different way as slot-based scheduling. Specifically, when determining the first CCE index for a PDCCH candidate, a different function g other than $f$ can be used. Alternatively, in one embodiment, '4' may serve as the highest AL in the function $f$, instead of '8'. Then, the same function $f$ can be used for determined the first CCE index for a PDCCH candidate in symbol-based scheduling.

In one embodiment, the reduced search space 550 for the terminal device 120-2 may share a same size with the reduced search space 540 for the terminal device 120-1, but from a different CCE index. For example, the different CCE index may be determined by applying the UE-ID of the terminal device 120-2, which is different from that of the terminal device 120-1, to the function $f$ As such, the search spaces for the terminal devices 120 can be reduced.

Figure 6:
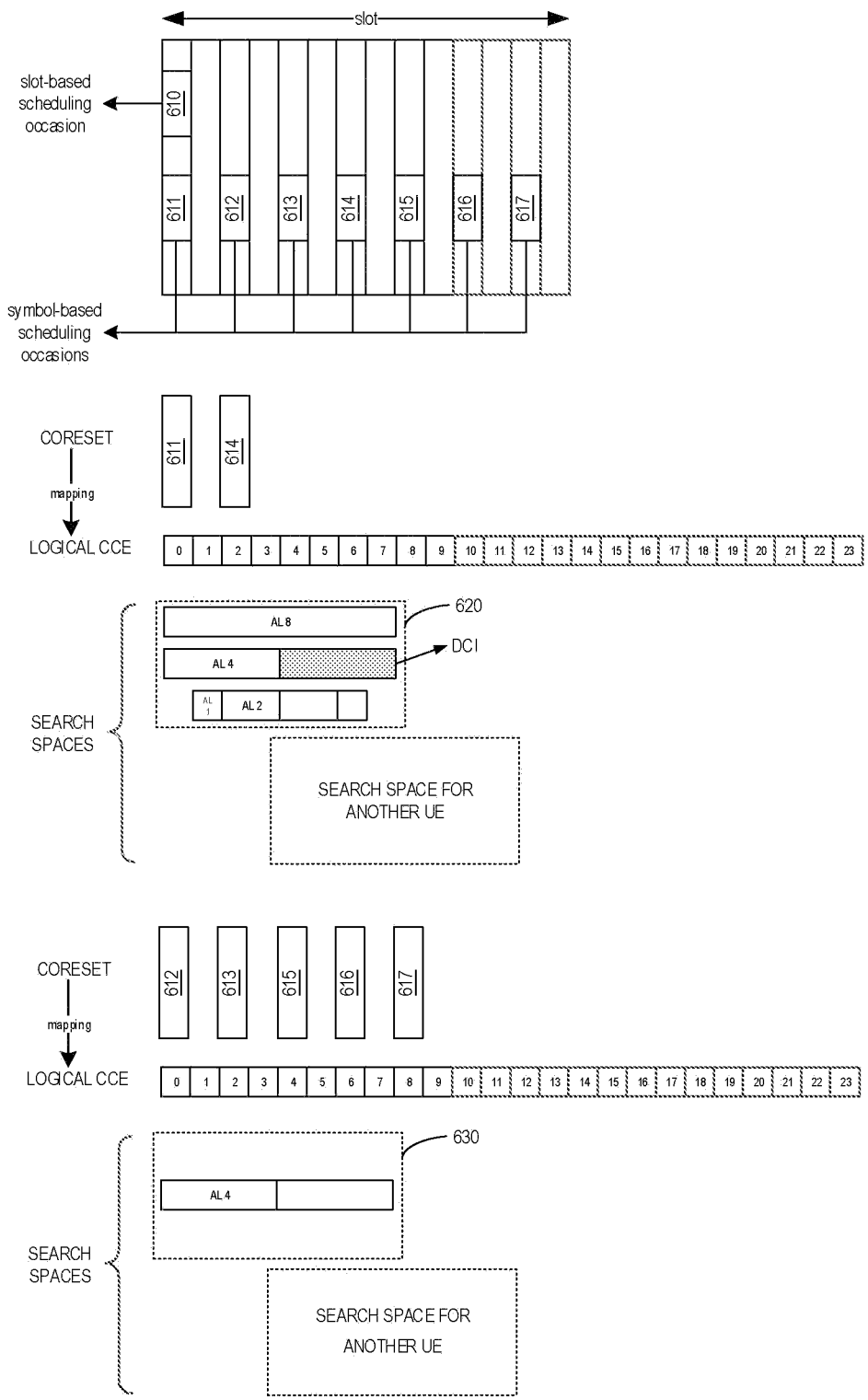
FIG. 6 shows an example of some embodiments of the present disclosure.

In some embodiments, the plurality of symbol-based CORESETs may include first and second symbol-based CORESETs, where the first symbol-based CORESET is followed by the second symbol-based CORESET. The network device 110 may determine the configuration for PDCCH transmission based on a predetermined aggregation level, such that the first symbol-based CORESET corresponds to an unreduced search space for PDCCH, and the second symbol-based CORESET corresponds to a reduced search space for PDCCH associated with the predetermined aggregation level. That is, search space reduction in one CORESET may depend on its association with a former CORESET. FIG. 6 shows an example of such embodiment.

In FIG. 6, for example, each slot may include 14 symbols in total. Different CORESETs may be configured for slot-based scheduling and symbol-based scheduling respectively. For example, as shown in FIG. 6, CORESET 610 is configured for slot-based scheduling, while CORESETs 611-

617 with a periodicity of 2 symbols within one slot are configured for symbol-based scheduling.

As shown in FIG. 6, CORESETs 611 and 614 may correspond to ordinary search spaces for PDCCH, such as an unreduced search space 620 for the terminal device 120-1. That is, the terminal device 120-1 may perform normal blind detections in the search space 620 for PDCCH. For example, the terminal device 120-1 may try every AL and every DCI format to attempt to decode the DCI in the search space 620. Once the terminal device 120-1 decodes the DCI successfully, it may determine the corresponding AL, such as '4'.

As shown in FIG. 6, CORESETs 612-613 following CORESET 611 as well as CORESETs 615-617 following CORESET 614 may correspond to reduced search spaces for PDCCH. A reduced search space for PDCCH corresponding to one of CORESETs 612-613 and 615-617 may be represented by 630. Specifically, the reduced search space 630 may be associated with the corresponding AL (such as, '4') determined by the terminal device 120-1.

In one embodiment, for example, the network device 110 may only allocate PDCCH candidates for AL 4 to CORESETs 612-613 and 615-617. That is, the reduced search space 630 may only include PDCCH candidates for the determined AL, as shown in FIG. 6. In this case, the terminal device 120-1 may perform BDs in the reduced search space 630 only consisting of PDCCH candidates for AL 4 accordingly.

In another embodiment, the network device 110 may only allocate PDCCH candidates for the ALs that are not less than the determined AL to CORESETs 612-613 and 615-617. That is, the reduced search space 630 may include PDCCH candidates for the ALs that are not less than the determined AL, for example, PDCCH candidates for ALs 8 and 4. In this case, the terminal device 120-1 may perform BDs in the reduced search space 630 consisting of PDCCH candidates for ALs 8 and 4 accordingly.

In yet another embodiment, the network device 110 may only allocate PDCCH candidates for the ALs that are not greater than the determined AL to CORESETs 612-613 and 615-617. That is, the reduced search space 630 may include PDCCH candidates for the ALs that are not greater than the determined AL, for example, PDCCH candidates for ALs 4, 2 and 1. In this case, the terminal device 120-1 may perform BDs in the reduced search space 630 consisting of PDCCH candidates for ALs 4, 2 and 1 accordingly.

In this way, the terminal device 120-1 may perform BDs in the reduced search spaces corresponding to CORESETs 612-613 and 615-617 respectively. Obviously, the search spaces for the terminal device 120-1 can be reduced.

Figure 7:
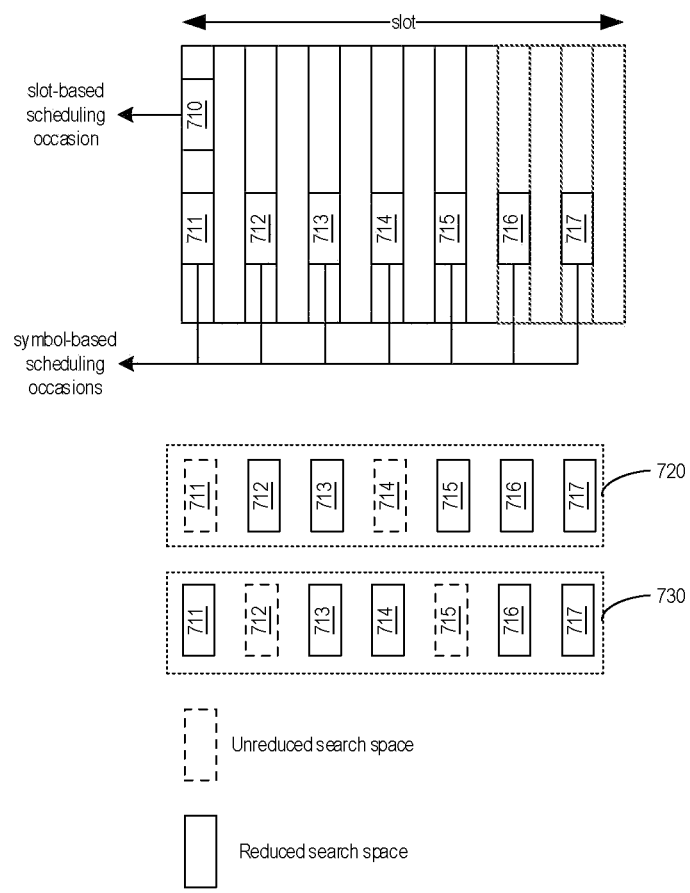
FIG. 7 shows an example of some embodiments of the present disclosure.

In some embodiments, a first subset of the plurality of symbol-based CORESETs may correspond to unreduced search spaces for PDCCH, while a second subset of the plurality of symbol-based CORESETs may correspond to reduced search spaces for PDCCH. In one embodiment, the configuration for PDCCH transmission determined by the network device 110 may include an indication of a pattern associated with the first and second subsets. FIG. 7 shows an example of such embodiment.

In FIG. 7, for example, each slot may include 14 symbols in total. Different CORESETs may be configured for slot-based scheduling and symbol-based scheduling respectively. For example, as shown in FIG. 7, CORESET 710 is configured for slot-based scheduling, while CORESETs 711-717 with a periodicity of 2 symbols within one slot are configured for symbol-based scheduling.

For the terminal device 120-1, CORESETs 711 and 714 may correspond to ordinary search spaces for PDCCH, while CORESETs 712-713 and 715-717 may correspond to reduced search spaces for PDCCH. The pattern of ordinary search spaces and reduced search spaces may be UE-specific, so as to balance collision in every CORESET.

In some embodiments, different patterns for different terminal devices may be determined based on different shift values. For example, as shown in FIG. 7, the pattern 730 for the terminal device 120-2 can be derived by shifting the pattern 720 for the terminal device 120-1. That is, for the terminal device 120-2, CORESETs 712 and 715 may correspond to ordinary search spaces for PDCCH, while CORESETs 711, 713-714 and 716-717 may correspond to reduced search spaces for PDCCH.

In some embodiments, the pattern may also indicate a proportion between the ordinary search spaces and the reduced search spaces. In one embodiment, the proportion may be determined and configured such that the maximum scheduling delay and the maximum number of BDs can be balanced.

Figure 8:
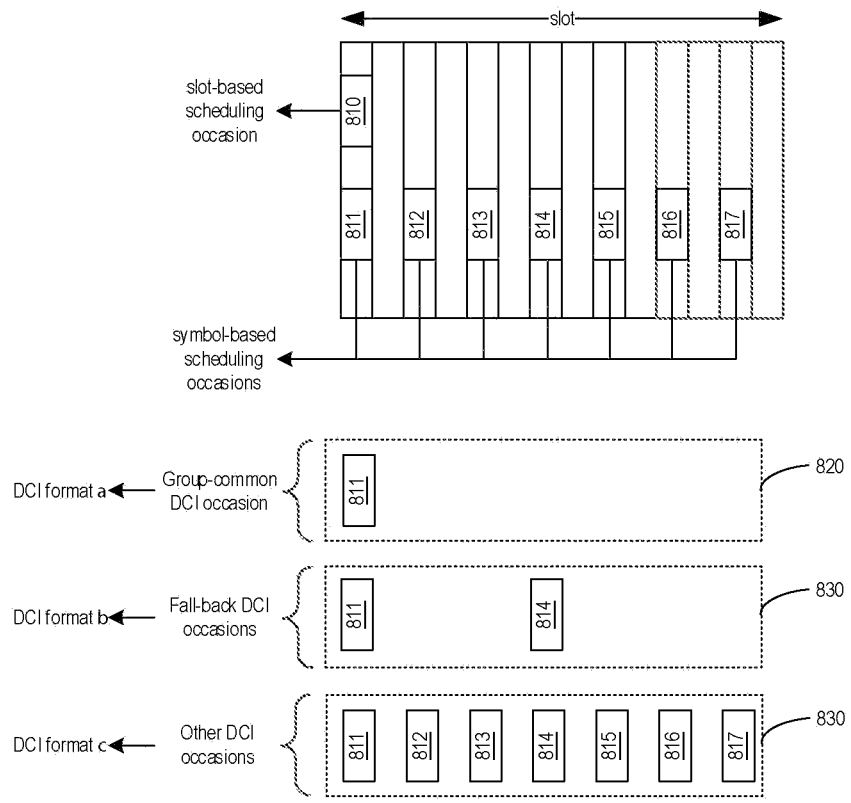
FIG. 8 shows an example of some embodiments of the present disclosure.

In some embodiments, the DCI to be transmitted by the network device 110 may include different DCI for different uses, and different DCI may be associated with different formats respectively. For example, DCI format a may be used for first DCI, DCI format b may be used for second DCI, DCI format c may be used for third DCI, . . . , and so on. In some embodiments, some DCI may only be transmitted in limited CORESETs. In some embodiment, the network device 110 may determine the configuration for PDCCH transmission such that different subsets of the plurality of symbol-based CORESETs are to be used for transmitting different DCI respectively. For example, the network device 110 may determine a third subset of the plurality of symbol-based CORESETs for transmitting the first DCI, a fourth subset of the plurality of symbol-based CORESETs for transmitting the second DCI, . . . , and so on. FIG. 8 shows an example of such embodiment.

In FIG. 8, for example, each slot may include 14 symbols in total. Different CORESETs may be configured for slot-based scheduling and symbol-based scheduling respectively. For example, as shown in FIG. 8, CORESET 810 is configured for slot-based scheduling, while CORESETs 811-817 with a periodicity of 2 symbols within one slot are configured for symbol-based scheduling.

As shown in FIG. 8, different DCI formats may be used for transmitting different DCI for different cases. For example, DCI format a is used for group-common DCI and the group-common DCI may be only transmitted in a subset 820, which includes CORESET 811. DCI format b is used for fall-back DCI and the fall-back DCI may be only transmitted in a subset 830, which includes CORESETs 811 and 814. DCI format c is used for other DCI and other DCI may be transmitted in a subset 840, which includes CORESETs 811-817. In this way, the terminal device 120 may attempt to decode DCI in DCI formats a, b and c in CORESET 811. The terminal device 120 may attempt to decode DCI in DCI formats b and c in CORESETs 814. The terminal device 120 may only attempt to decode DCI in DCI format c in CORESETs 812-813 and 815-817.

In one embodiment, different DCI formats may be associated with different sizes. For example, in one embodiment, the sizes for the formats a, b and c may be different from each other. In this way, the maximum number of BDs per monitoring occasion by the terminal device 120 can be further reduced. In another embodiment, different DCI formats may be associated with a same size, and thus the number of times to parse DCI formats by the terminal device 120 can be reduced.

In some embodiments, the network device 110 may determine the configuration for PDCCH transmission based on a preconfigured slot format. The preconfigured slot format may indicate at least one symbol in the slot to be used for downlink transmission. Specifically, the at least one symbol may correspond to a fifth subset of the plurality of symbol-based CORESETs. In one embodiment, for example, the network device 110 may allocate more PDCCH candidates to the fifth subset of the plurality of symbol-based CORESETs. Specifically, in one embodiment, the network device 110 may allocate all PDCCH candidates to the fifth subset of the plurality of symbol-based CORESETs. That is, the DCI may be only transmitted in the fifth subset of the plurality of symbol-based CORESETs.

Figure 9:
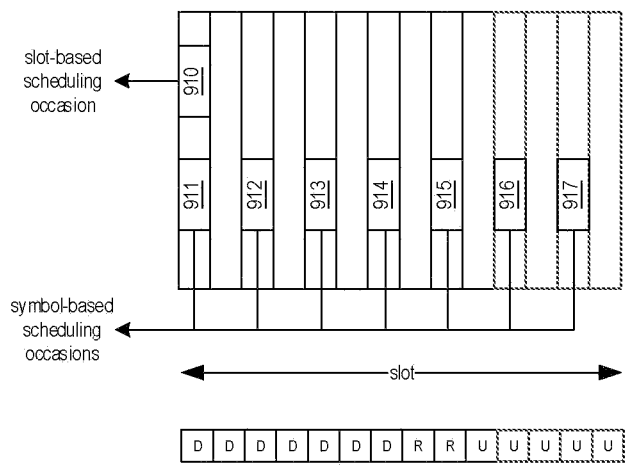
FIG. 9 shows an examples of some embodiments of the present disclosure.

In some embodiments, the slot format may be configured for the terminal device 120. For example, the slot format can be configured via higher layer signaling, such as signaling on Radio Resource Control (RRC) Layer, Medium Access Control (MAC) layer and so on, or by slot format information (SFI) which may be include in the DCI. In some embodiments, once the terminal device 120 is configured with the slot format, it may perform BDs based on the slot format. FIG. 9 shows an example of such embodiment.

In FIG. 9, for example, each slot may include 14 symbols in total. Different CORESETs may be configured for slot-based scheduling and symbol-based scheduling respectively. For example, as shown in FIG. 8, CORESET 910 is configured for slot-based scheduling, while CORESETs 911-917 with a periodicity of 2 symbols within one slot are configured for symbol-based scheduling. Further, a slot format is configured, which indicates that some symbols in the slot are used for downlink transmission, some symbols in the slot are used for uplink transmission, and the other symbols in the slot are reserved or unknown. For example, as shown in FIG. 9, the symbols for downlink transmission are labelled with 'D', the symbols for uplink transmission are labelled with 'U', and the reserved or unknown symbols are labelled with 'R'. In this case, based on the configured slot format, the maximum number of BDs performed by the terminal device 120 per monitoring occasion can be further reduced.

In some embodiments, for example, the maximum number of BDs per monitoring occasion in an all-downlink slot at a given numerology may be defined as Table 2.

TABLE 2

| CORESET periodicity | Maximum Number of BDs per monitoring occasion |
| --- | --- |
| 2 symbols | $Y_1$ |
| 7 symbols | $Y_2$ |

In some embodiments, if K CORESETs are unavailable for downlink transmission, for example corresponding to the symbols labelled with 'U' and 'R', the maximum number of BDs per monitoring occasion can be determined as Table 3. For example, as shown in FIG. 9, the K CORESETs unavailable for downlink transmission include CORESETs 915-917, and thus K=3. In this way, a terminal device may have more opportunities for scheduling without increasing the number of BDs in the slot.

TABLE 3

| CORESET periodicity | Maximum Number of BDs per monitoring occasion |
| --- | --- |
| 2 symbols | $Y_1 + K^* Y_1/(7 - K)$ |
| 7 symbols | $Y_2 + K^* Y_2/(2 - K)$ |

In some embodiments, if the terminal device 120 is also configured with the SFI, it can determine which CORESETs are used for downlink transmission. In some embodiments, the terminal device 120 may only perform BDs in those CORESETs for downlink transmission, and skip the other CORESETs. In this way, the terminal device may further reduce the number of BDs without additional signaling.

Figure 10:
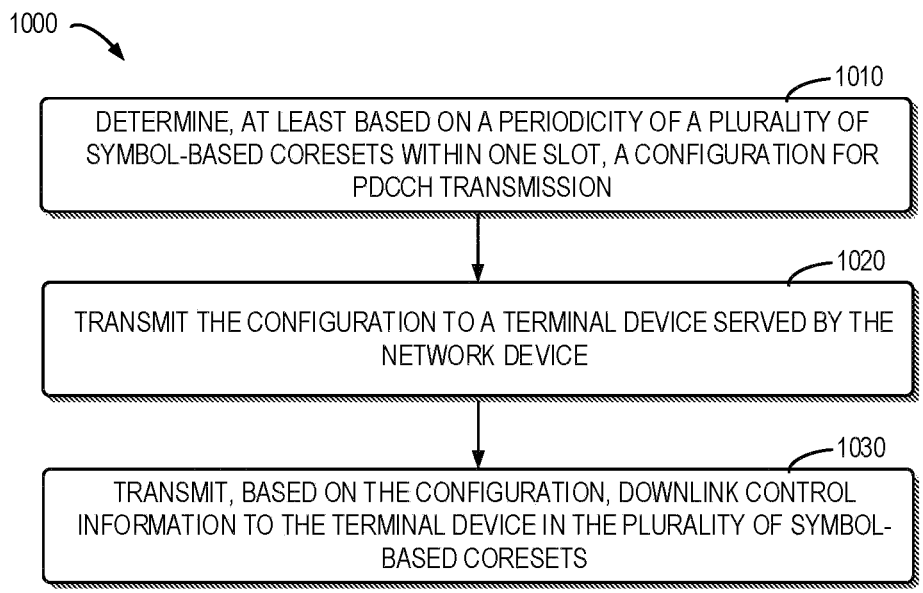
FIG. 10 shows a flowchart of an example method in accordance with some embodiments of the present disclosure.

FIG. 10 shows a flowchart of an example method 1000 in accordance with some embodiments of the present disclosure. The method 1000 can be implemented at a network device 110 as shown in FIG. 1. For the purpose of discussion, the method 800 will be described from the perspective of the network device 110 with reference to FIG. 1.

In act 1010, the network device 110 determines, at least based on a periodicity of a plurality of symbol-based CORESETs within one slot, a configuration for PDCCH transmission. In one embodiment, the configuration may indicate an allocation of a first number of PDCCH candidates to the plurality of symbol-based CORESETs. In one embodiment, the first number of PDCCH candidates is less than a second number of PDCCH candidates preconfigured for a slot-based CORESET.

In some embodiments, the slot-based CORESET corresponds to a third number of control channel elements (CCEs). In some embodiments, each of the plurality of symbol-based CORESETs corresponds to a fourth number of CCEs, and the third number is greater than or equal to the fourth number.

In some embodiments, the plurality of symbol-based CORESETs include first and second symbol-based CORESETs, and the first symbol-based CORESET is followed by the second symbol-based CORESET. In some embodiments, the network device 110 may determine the configuration for PDCCH transmission based on a predetermined aggregation level, such that: the first symbol-based CORESET corresponds to an unreduced search space for PDCCH, and the second symbol-based CORESET corresponds to a reduced search space for PDCCH associated with the predetermined aggregation level.

In some embodiments, a first subset of the plurality of symbol-based CORESETs corresponds to unreduced search spaces for PDCCH and a second subset of the plurality of symbol-based CORESETs corresponds to reduced search spaces for PDCCH. In some embodiments, the network device 110 may determine the configuration for PDCCH transmission by determining a pattern associated with the first and second subsets. In one embodiment, the pattern indicates a proportion between the first and second subsets.

In some embodiments, the DCI include first DCI in a first format and second DCI in a second format, the first format being different from the second format. In some embodiments, the network device 110 may determine the configuration for PDCCH transmission by determining a third subset of the plurality of symbol-based CORESETs for transmitting the first DCI and a fourth subset of the plurality of symbol-based CORESETs for transmitting the second DCI, the third subset being different from the fourth subset.

In some embodiments, the network device 110 may determine the configuration for PDCCH transmission based on a preconfigured slot format indicating at least one symbol in the slot to be used for downlink transmission.

In some embodiments, the at least one symbol is associated with a fifth subset of the plurality of symbol-based CORESETs. In some embodiments, the network device 110 may determine the configuration based on the configured slot format, such that the first number of PDCCH candidates are allocated to the fifth subset.

In act 1020, the network device 110 transmits the configuration to the terminal device 120. Then, in act 1030, the network device 110 transmits, based on the configuration, downlink control information (DCI) to the terminal device 120 in the plurality of symbol-based CORESETs.

Figure 11:
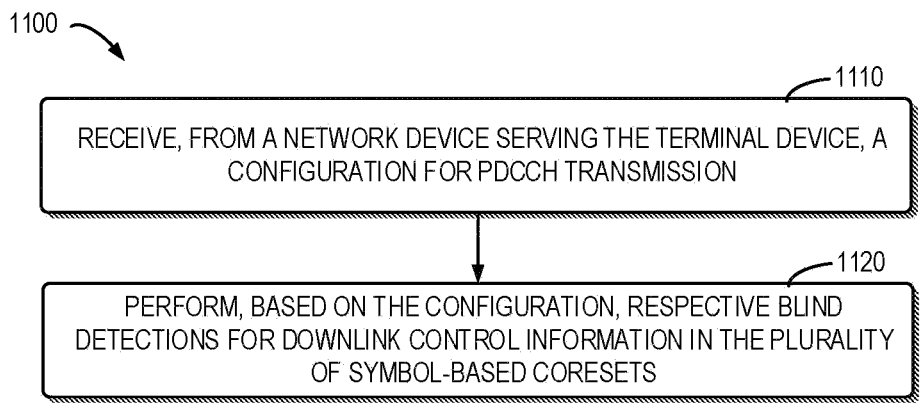
FIG. 11 shows a flowchart of an example method in accordance with some embodiments of the present disclosure.

FIG. 11 shows a flowchart of an example method 1100 in accordance with some embodiments of the present disclosure. The method 1100 can be implemented at the terminal device 120 as shown in FIG. 1. For the purpose of discussion, the method 1100 will be described from the perspective of the terminal device 120 with reference to FIG. 1.

In act 1110, the terminal device 120 receives, from the network device 110, a configuration for PDCCH transmission. In one embodiment, the configuration may indicate an allocation of a first number of PDCCH candidates to a plurality of symbol-based control resource sets (CORESETs) within one slot. In one embodiment, the first number of PDCCH candidates is less than a second number of PDCCH candidates preconfigured for a slot-based CORESET.

In act 1120, the terminal device 120 performs, based on the configuration, respective blind detections for downlink control information (DCI) in the plurality of symbol-based CORESETs.

In some embodiments, the slot-based CORESET corresponds to a third number of control channel elements (CCEs). In some embodiments, each of the plurality of symbol-based CORESETs corresponds to a fourth number of CCEs, and the third number is greater than or equal to the fourth number.

In some embodiments, the plurality of symbol-based CORESETs include first and second symbol-based CORESETs, and the first symbol-based CORESET is followed by the second symbol-based CORESET. In some embodiments, the configuration may indicate that the first symbol-based CORESET corresponds to an unreduced search space for PDCCH and the second symbol-based CORESET corresponds to a reduced search space for PDCCH. In some embodiments, the terminal device 120 may perform a first blind detection for first DCI in the unreduced search space for PDCCH. In response to detecting the first DCI, the terminal device 120 may determine an aggregation level associated with the reduced search space for PDCCH. Then, the terminal device 120 may perform, based on the aggregation level, a second blind detection for second DCI in the reduced search space for PDCCH.

In some embodiments, the configuration indicates a first subset of the plurality of symbol-based CORESETs for transmitting third DCI in a first format and a second subset of the plurality of symbol-based CORESETs for transmitting fourth DCI in a second format, the first format being different from the second format. In some embodiments, the terminal device 120 may perform the respective blind detections for DCI by performing a third blind detection for the third DCI in one of the first subset of the plurality of symbol-based CORESETs and performing a fourth blind detection for the fourth DCI in one of the second subset of the plurality of symbol-based CORESETs.

In some embodiments, the configuration includes an indication of a slot format, the slot format indicating at least one symbol in the slot to be used for downlink transmission. In some embodiments, the terminal device 120 may performed, based on the slot format, the respective blind detections for DCI.

In some embodiments, the at least one symbol for downlink transmission is associated with a third subset of the plurality of symbol-based CORESETs. In some embodiments, the terminal device 120 may perform the respective blind detections for DCI in the third subset.

Figure 12:
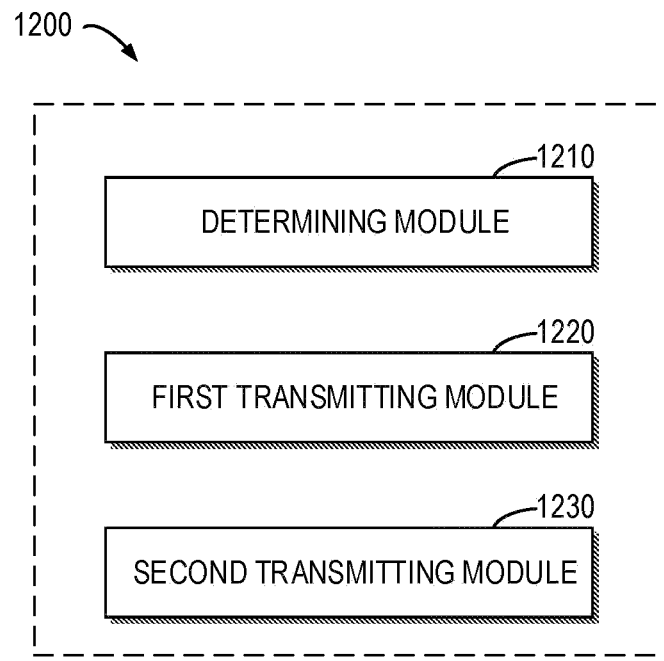
FIG. 12 shows a block diagram of an apparatus in accordance with some embodiments of the present disclosure.

FIG. 12 shows a block diagram of an apparatus 1200 in accordance with some embodiments of the present disclosure. The apparatus 1200 can be considered as an example implementation of the network device 110 as shown in FIG. 1. As shown, the apparatus 1200 includes a determining module 1210 configured to determine, at least based on a periodicity of a plurality of symbol-based control resource sets (CORESETs) within one slot, a configuration for PDCCH transmission, the configuration indicating an allocation of a first number of PDCCH candidates to the plurality of symbol-based CORESETs and the first number of PDCCH candidates being less than a second number of PDCCH candidates preconfigured for a slot-based CORESET. The apparatus 1200 also includes a first transmitting module 1220 configured to transmit the configuration to a terminal device served by the network device. In addition, the apparatus 1200 also includes a second transmitting module 1230 configured to transmit, based on the configuration, downlink control information (DCI) to the terminal device in the plurality of symbol-based CORESETs.

Figure 13:
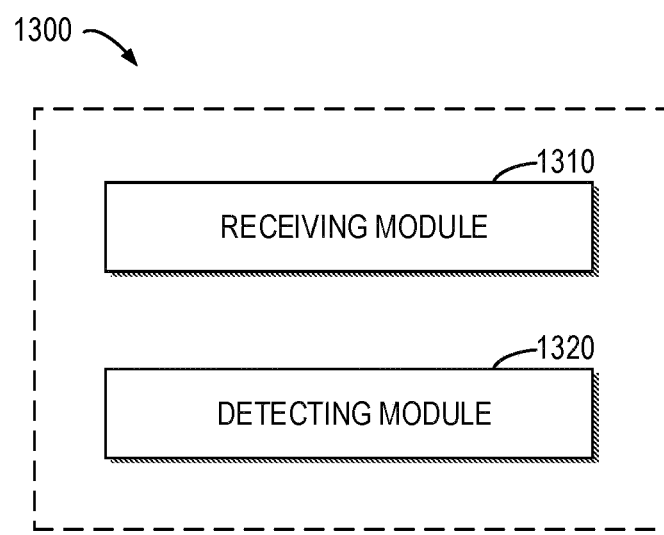
FIG. 13 shows a block diagram of an apparatus in accordance with some embodiments of the present disclosure.

FIG. 13 shows a block diagram of an apparatus 1300 in accordance with some embodiments of the present disclosure. The apparatus 1300 can be considered as an example implementation of the terminal device 120 as shown in FIG. 1. As shown, the apparatus 1300 includes a receiving module 1310 configured to receive, from a network device serving the terminal device, a configuration for PDCCH transmission, the configuration indicating an allocation of a first number of PDCCH candidates to a plurality of symbol-based control resource sets (CORESETs) within one slot, and the first number of PDCCH candidates being less than a second number of PDCCH candidates preconfigured for a slot-based CORESET. The apparatus 1300 also includes a detecting module 1320 configured to perform, based on the configuration, respective blind detections for downlink control information (DCI) in the plurality of symbol-based CORESETs.

For the sake of clarity, FIGS. 12 and/or 13 do not illustrate some optional modules of the apparatuses 1200 and/or 1300. However, it should be understood that various features as described with reference to FIGS. 1-10 are likewise applicable to the apparatuses 1200 and various features as described with reference to FIGS. 1-9 and 11 are likewise applicable to the apparatuses 1300. Moreover, respective modules of the apparatuses 1200 and/or 1300 may be hardware modules or software modules. For example, in some embodiments, the apparatuses 1200 and/or 1300 may be implemented partially or completely by software and/or firmware, e.g., implemented as a computer program product embodied on the computer-readable medium. Alternatively, or in addition, the apparatuses 1000 and/or 1100 may be partially or completely implemented based on hardware, e.g., implemented as an integrated circuit (IC), an application-specific integrated circuit (ASIC), a system on chip (SOC), a field programmable gate array (FPGA) and the like. The scope of the present disclosure is not limited in this aspect.

Figure 14:
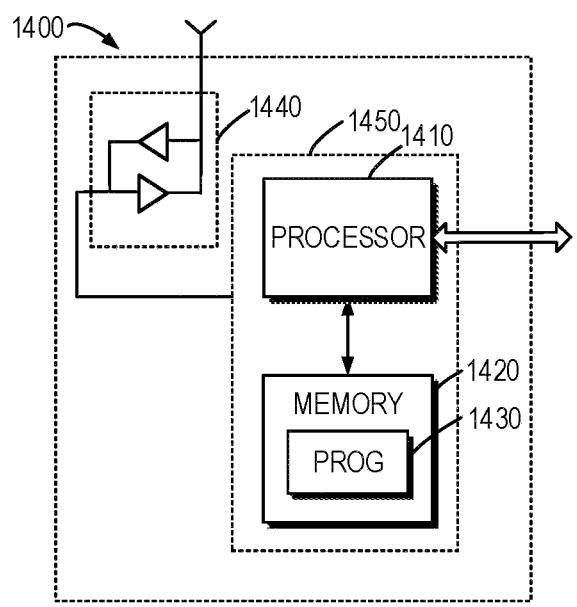
FIG. 14 is a simplified block diagram of a device that is suitable for implementing embodiments of the present disclosure.

FIG. 14 is a simplified block diagram of a device 1400 that is suitable for implementing embodiments of the present disclosure. The device 1400 can be considered as a further example implementation of a network device 110 or a terminal device 120 as shown in FIG. 1. Accordingly, the device 1400 can be implemented at or as at least a part of the network devices 110 or the terminal device 120.

As shown, the device 1400 includes a processor 1410, a memory 1420 coupled to the processor 1410, a suitable transmitter (TX) and receiver (RX) 1440 coupled to the processor 1410, and a communication interface coupled to the TX/RX 1440. The memory 1410 stores at least a part of a program 1430. The TX/RX 1440 is for bidirectional communications. The TX/RX 1440 has at least one antenna to facilitate communication, though in practice an Access Node mentioned in this application may have several ones. The communication interface may represent any interface that is necessary for communication with other network elements, such as X2 interface for bidirectional communications between eNBs, S1 interface for communication between a Mobility Management Entity (MME)/Serving Gateway (S-GW) and the eNB, Un interface for communication between the eNB and a relay node (RN), or Uu interface for communication between the eNB and a terminal device.

The program 1430 is assumed to include program instructions that, when executed by the associated processor 1410, enable the device 1400 to operate in accordance with the embodiments of the present disclosure, as discussed herein with reference to FIGS. 1 to 11. The embodiments herein may be implemented by computer software executable by the processor 1410 of the device 1400, or by hardware, or by a combination of software and hardware. The processor 1410 may be configured to implement various embodiments of the present disclosure. Furthermore, a combination of the processor 1410 and memory 1410 may form processing means 1450 adapted to implement various embodiments of the present disclosure.

The memory 1410 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 1410 is shown in the device 1400, there may be several physically distinct memory modules in the device 1400. The processor 1410 may be of any type suitable to the local technical network, and may include one or more of general purpose computers, special purpose computers, microprocessors, digital signal processors (DSPs) and processors based on multicore processor architecture, as non-limiting examples. The device 1400 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to any of FIGS. 1 to 11. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method performed by a terminal device, comprising:
   receiving a configuration corresponding to a first search space set and a second search space set; and
   monitoring one or more PDCCH candidates in the second search space set depending on a PDCCH monitored by the terminal device in the first search space set.

2. The method of claim 1, wherein the first search space set is associated with the second search space set.

3. The method of claim 2, wherein a number of PDCCH candidates in the first search space set is less than a number of PDCCH candidates in the second search space set.

4. The method of claim 1 further comprising:
   monitoring one or more PDCCH candidates based on one slot or a number of symbols within one slot, wherein a maximum number of PDCCH candidates based on the number of symbols within the one slot is no more than a maximum number of PDCCH candidates based on one slot.

5. The method of claim 4, wherein the maximum number of PDCCH candidates based on the number of symbols within the one slot is less than the maximum number of PDCCH candidates based on one slot.

6. The method of claim 4, wherein the maximum number of PDCCH candidates based on the number of symbols within the one slot is determined based on a product of a factor and the maximum number of PDCCH candidates based on one slot, wherein $0<=\text{factor}<=1$.

7. A terminal device, comprising a processor configured to:
   receive a configuration corresponding to a first search space set and a second search space set; and
   monitor one or more PDCCH candidates in the second search space set depending on a PDCCH monitored by the terminal device in the first search space set.

8. The terminal device of claim 7, wherein the first search space set is associated with the second search space set.

9. The terminal device of claim 8, wherein the number of PDCCH candidates in the first search space set is less than the number of PDCCH candidates in the second search space set.

10. The terminal device of claim 7, wherein the processor is further configured to:
    monitor one or more PDCCH candidates based on one slot or a number of symbols within one slot, wherein a maximum number of PDCCH candidates based on the number of symbols within the one slot is no more than a maximum number of PDCCH candidates based on one slot.

11. The terminal device of claim 10, wherein the maximum number of PDCCH candidates based on the number of symbols within the one slot is less than the maximum number of PDCCH candidates based on one slot.

12. The terminal device of claim 10, wherein the maximum number of PDCCH candidates based on the number of symbols within the one slot is determined based on a product of a factor and the maximum number of PDCCH candidates based on one slot, wherein $0<=\text{factor}<=1$.

13. A method performed by a network device, comprising:
    transmitting a configuration corresponding to a first search space set and a second search space set; and
    transmitting a PDCCH in the second search space set depending on a PDCCH transmission in the first search space set, wherein the second search space set and the first search space set are to be monitored by a terminal device.

14. The method of claim 13, wherein the first search space set is associated with the second search space set.

15. The method of claim 13, wherein a number of PDCCH candidates in the first search space set is less than a number of PDCCH candidates in the second search space set.

16. The method of claim 13, wherein one or more PDCCH candidates for the PDCCH are based on one slot or a number of symbols within one slot, wherein a maximum number of PDCCH candidates based on the number of symbols within the one slot is no more than a maximum number of PDCCH candidates based on one slot.

17. The method of claim 16, wherein the maximum number of PDCCH candidates based on the number of symbols within the one slot is less than the maximum number of PDCCH candidates based on one slot.

* * * * *